United States Patent [19]

Sackett et al.

[11] 4,235,298
[45] Nov. 25, 1980

[54] TRUCK OR TRUCK TRACTOR WINDSHIELD AIR RAM ARRANGEMENT

[75] Inventors: Roger W. Sackett, Beaverton; Thomas R. Liethen, Portland, both of Oreg.

[73] Assignee: Freightliner Corporation, Portland, Oreg.

[21] Appl. No.: 15,764

[22] Filed: Feb. 28, 1979

[51] Int. Cl.³ .................. B60K 13/02; B60K 13/06
[52] U.S. Cl. ........................... 180/54 A; 180/69 C; 98/2.17; 123/198 E
[58] Field of Search .................... 180/54 A, 69 R; 296/1 S, 91; 98/2.07, 2.16, 2.17, 2.19; 123/198 E; 55/385 B

[56] References Cited

U.S. PATENT DOCUMENTS

| | | | |
|---|---|---|---|
| 2,227,927 | 1/1941 | Downs | 180/54 A X |
| 2,975,696 | 3/1961 | Jewell | 98/2.17 |
| 3,157,104 | 11/1964 | Nallinger | 98/2.17 X |
| 3,934,992 | 1/1976 | Thompson | 180/54 A X |

FOREIGN PATENT DOCUMENTS 2641444 3/1978 Fed. Rep. of Germany ........ 180/54 A
919339 2/1963 United Kingdom ................ 180/54 A

*Primary Examiner*—Charles A. Marmor
*Attorney, Agent, or Firm*—Klarquist, Sparkman, Campbell, Leigh, Hall & Whinston

[57] ABSTRACT

A truck or truck tractor having an opening between the base of its windshield and the rear end of its hood. Air pressure in this area drives air through a moisture tray and a collector trap to a conduit to an air cleaner leading to a turbocharger. Rain, snow and/or ice in the air is removed into the moisture tray and the collector trap, and the air cleaner has a moisture filter therein to remove any, slight residue.

5 Claims, 5 Drawing Figures

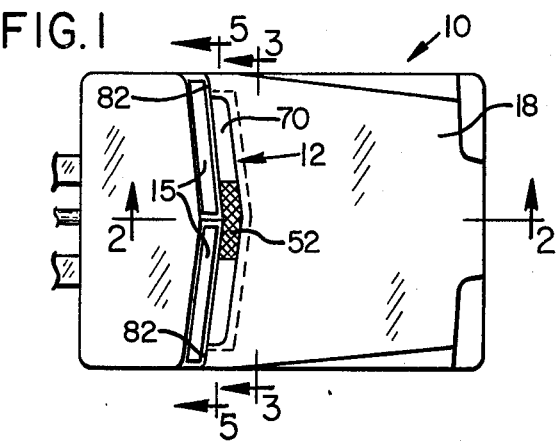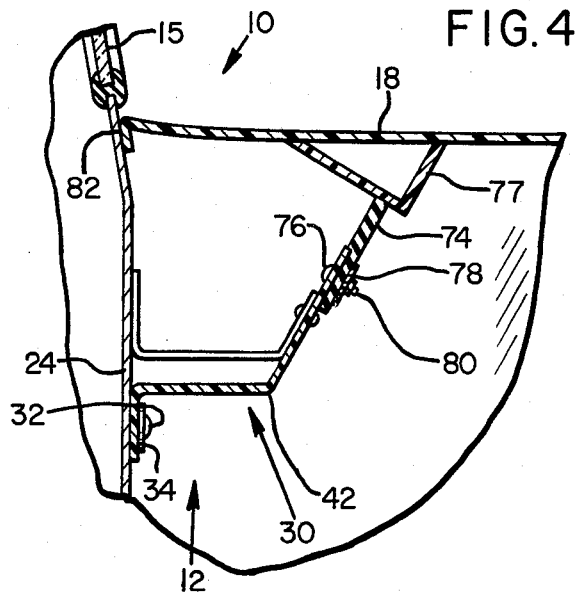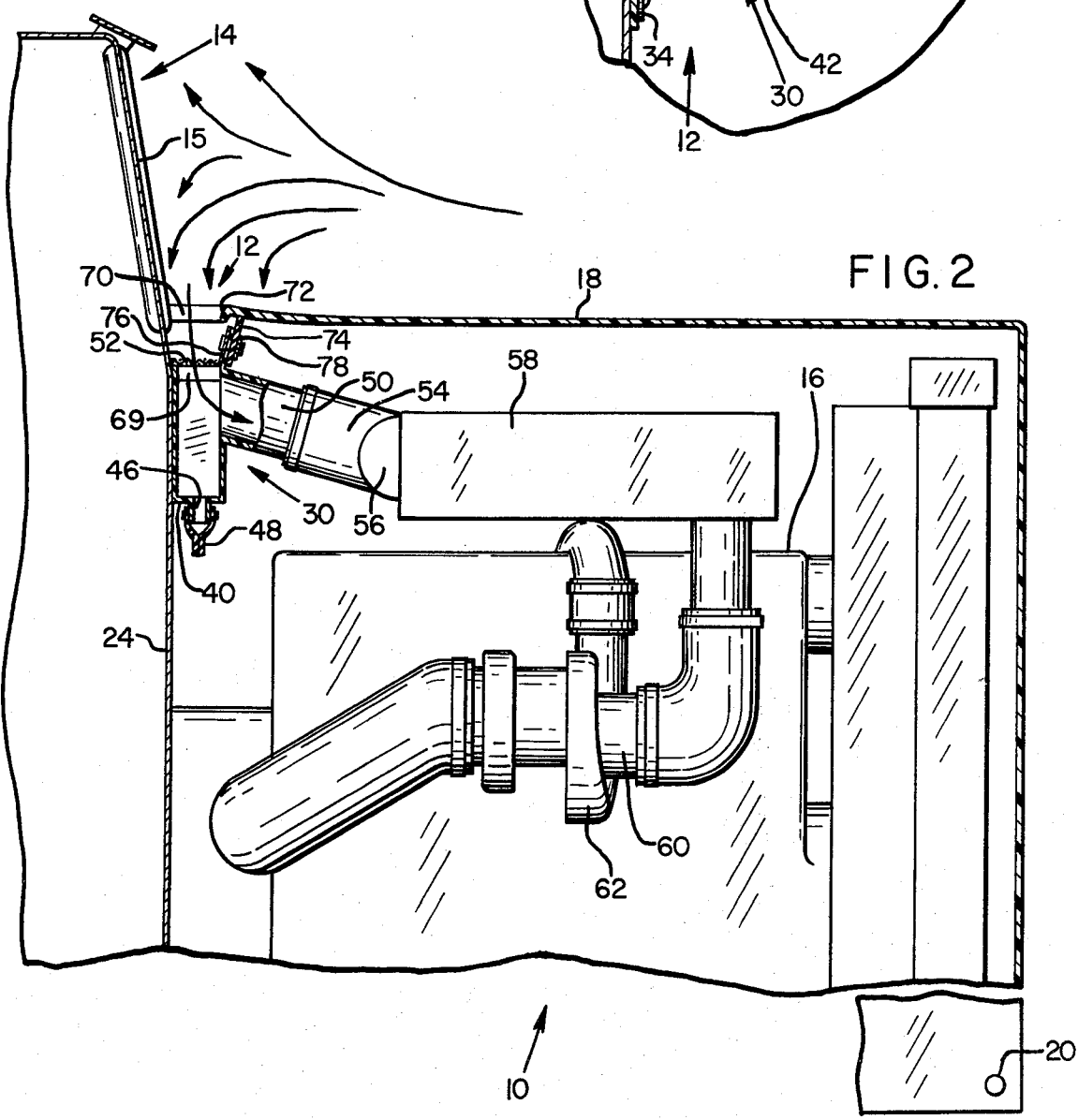

TRUCK OR TRUCK TRACTOR WINDSHIELD AIR RAM ARRANGEMENT

DESCRIPTION

This invention relates to a truck or truck tractor windshield air ram arrangement, and has for an object thereof the provision of a truck tractor windshield air ram arrangement.

Another object of the invention is to provide an air intake for a truck or truck tractor engine from air at the bottom of the windshield.

A further object of the invention is to provide a truck or truck tractor with an opening between its windshield and its hood through which air is forced into a trough and a collector trap to an air cleaner leading to a turbocharger.

In the drawings:

FIG. 1 is a fragmentary, top plan view of a truck or truck tractor having a windshield air ram arrangement forming one embodiment of the invention;

FIG. 2 is an enlarged, fragmentary, vertical section taken along line 2—2 of FIG. 1;

FIG. 4 is an enlarged, fragmentary, vertical section taken along line 4—4 of FIG. 3; and, FIG. 5 is an enlarged, fragmentary, vertical section taken along line 5—5 of FIG. 1.

Figure 3:
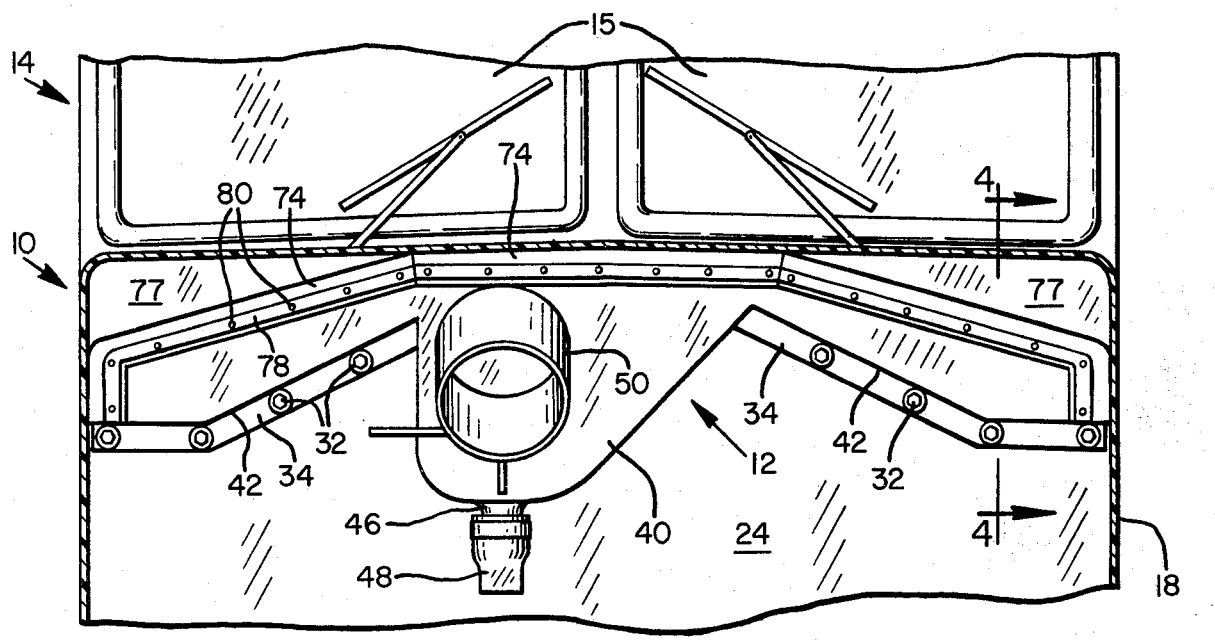
FIG. 3 is an enlarged, fragmentary, vertical section taken along line 3—3 of FIG. 1.

A truck or truck tractor 10 having a windshield air ram arrangement 12 forming one specific embodiment of the invention includes a cab 14 having a windshield 15 and an engine 16 (FIG. 2) positioned forwardly of the windshield and a hood 18 pivotally mounted at 20 on the chassis at the front end and bottom of the hood and latched by a well known releasable latch (not shown).

Figure 5:
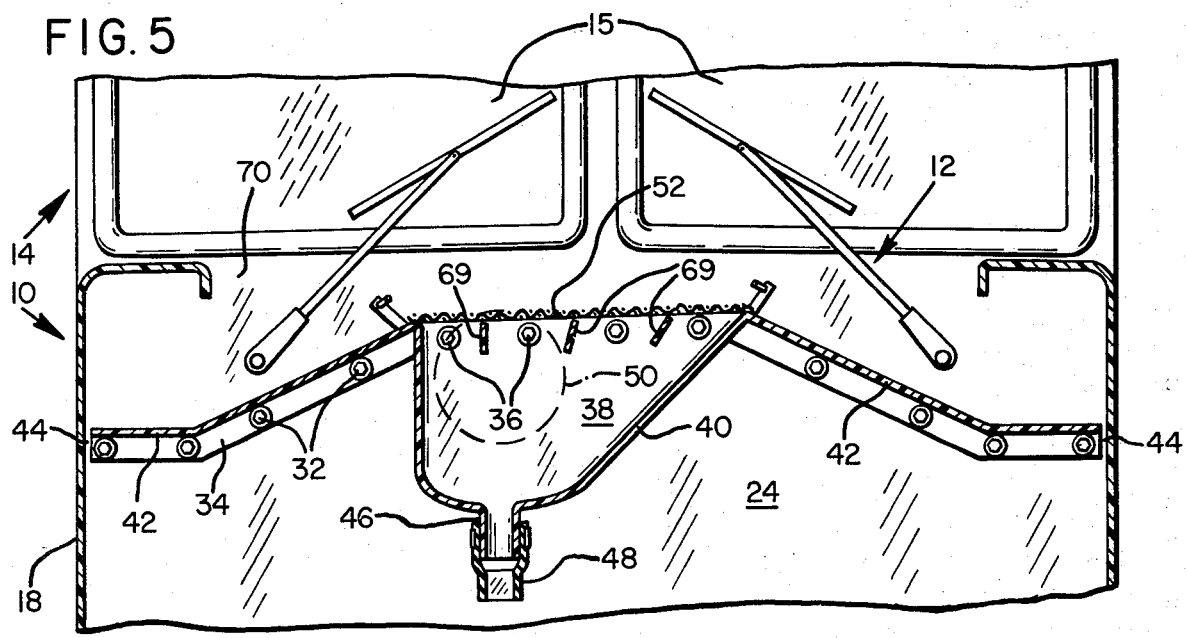

A moisture tray or trough 30 is secured to the dash by screws 32 (FIG. 5) extending through flanges 34 of the trough and screws 36 extending through backwall 38 of a collector trap 40 forming the central portion of the trough 30 and from which side portions 42 slope to side drain openings 44 between the trough and the sides of the hood 18. The trap 40 is tapered to a bottom drain tube 46 normally closed by a rubber valve 48 which is opened by the weight of water thereon to let the water pass on through to drop behind the engine to the ground. The trap 40 has a tubular air outlet 50 near the top thereof and under a screen 52 and a hose 54 connects the outlet 50 to an intake 56 of a known air cleaner 58 leading to an air intake 60 of a conventional turbocharger 62 driven by exhaust gases from the engine and supplying supercharged air to the engine. Partitions 69 guide air into the trap 40.

The hood 18 has a slightly angled slot 70 bordered by a stiffening flange 72 of the hood and the portion of the dash 24 just below the windshield 14. A resilient weatherstrip 74 is engaged by the hood and angular filler members 77 secured to the hood. The weatherstrip 74 is clamped to a flange 76 of the trough 30 by a clamping strip 78 and screws 80. Flanged, narrow, end portions 82 of the hood engage the dash.

When the truck or truck tractor 10 is moved forwardly, static pressure of the air builds up at the lower portion of the windshield 15 and the air flows through the slot 70 into and through the trough 30 into and through the trap 40, into and through the outlet 50 into the air cleaner 58 and into the turbocharger 62, all with a substantial ram effect. Moisture and dirt and debris are dropped into the trough 30 and on the screen 52, and moisture and small particles passing through the screen drop into the lower portion of the trap 40. Moisture in the trap opens the valve 48 and drops to the ground.

What is claimed is:

1. In a truck or truck tractor,
   a cab having a windshield,
   a hood positioned forwardly of the windshield and spaced from the lower portion of the windshield to form an air entrance slot,
   a trough mounted below the slot,
   wipers mounted in said trough on either side of the centerline thereof,
   said trough having a raised central portion formed with a pocket,
   engine means having an air intake,
   and filter means connecting the pocket to the air intake of the engine means.

2. The truck or truck tractor of claim 1 including a moisture trap opening upwardly into the pocket.

3. The truck or truck tractor of claim 2 including check valve means connected to a drain of the moisture trap.

4. The truck or truck tractor of claims 1, 2 or 3 wherein one side of the trough is secured to a firewall of the cab, the other side of the trough having a sealing strip engaged by the hood when the hood is closed.

5. The truck or truck tractor of claim 4 wherein the trough has a bottom sloping away from the trap and provided with side drain means.

* * * * *